United States Patent
Besenzoni

(10) Patent No.: US 9,187,186 B2
(45) Date of Patent: Nov. 17, 2015

(54) REDUCED DIMENSIONS PLATFORM FOR THE LANDING OF AN AIRCRAFT ON AN ACCESS FACILITY

(75) Inventor: Giovanni Besenzoni, Sarnico (IT)

(73) Assignee: B. FINANCIAL S.R.L., Sarnico (BG) (IT)

( * ) Notice: Subject to any disclaimer, the term of this patent is extended or adjusted under 35 U.S.C. 154(b) by 475 days.

(21) Appl. No.: 13/695,025

(22) PCT Filed: Apr. 28, 2011

(86) PCT No.: PCT/IT2011/000132
§ 371 (c)(1),
(2), (4) Date: Dec. 3, 2012

(87) PCT Pub. No.: WO2011/135605
PCT Pub. Date: Nov. 3, 2011

(65) Prior Publication Data
US 2013/0134260 A1    May 30, 2013

(30) Foreign Application Priority Data

Apr. 30, 2010 (IT) .............................. VI2010A0119

(51) Int. Cl.
| | |
|---|---|
| B64F 1/00 | (2006.01) |
| B64F 1/36 | (2006.01) |
| B63B 3/48 | (2006.01) |
| B63B 35/50 | (2006.01) |

(Continued)

(52) U.S. Cl.
CPC ... B64F 1/36 (2013.01); B63B 3/48 (2013.01); B63B 35/50 (2013.01); B64F 1/007 (2013.01); B64F 1/02 (2013.01); E01F 3/00 (2013.01); B63B 2017/0072 (2013.01)

(58) Field of Classification Search
CPC ............ B64F 1/00; B64F 1/007; B64F 1/025; B64F 1/12
USPC ................................... 244/114 R, 110 E, 116
See application file for complete search history.

(56) References Cited

U.S. PATENT DOCUMENTS

| | | | | |
|---|---|---|---|---|
| 3,513,992 | A | * | 5/1970 | Handler ......................... 414/259 |
| 3,815,299 | A | * | 6/1974 | Sorensen et al. ................... 52/66 |

(Continued)

FOREIGN PATENT DOCUMENTS

FR      2912159 A1      8/2008

OTHER PUBLICATIONS

International Search Report Nov. 17, 2011.

*Primary Examiner* — Tien Dinh
*Assistant Examiner* — Assres H Woldemaryam
(74) *Attorney, Agent, or Firm* — Hedman & Costigan, P.C.; James V. Costigan; Kathleen A. Costigan

(57) ABSTRACT

A reduced dimensions platform (1) for the landing of an aircraft on an access facility (B) having a support base (2), suitable to be fixed on a reference surface (P) belonging to said access facility (B), and a landing footboard (3), superiorly connected with said support base (2) and suitable to receive said aircraft. Specifically, the landing footboard (3) includes a central body (4), coupled with support base (2), and a plurality of peripheral panels (5), operatively connected with drive means (6) which move the peripheral panels (5) from/to a rest position, in which said peripheral panels (5) are contained within the dimensions of the central body (4), to/from an operating position, in which the peripheral panels (5) projects laterally from the central body (4).

20 Claims, 14 Drawing Sheets

(51) Int. Cl.
 B64F 1/02 (2006.01)
 E01F 3/00 (2006.01)
 B63B 17/00 (2006.01)

(56) References Cited

U.S. PATENT DOCUMENTS

| | | | | |
|---|---|---|---|---|
| 4,106,256 A | * | 8/1978 | Cody | 52/646 |
| 4,116,408 A | | 9/1978 | Soloy | |
| 4,474,130 A | * | 10/1984 | Birkeland | 114/258 |
| 4,665,857 A | * | 5/1987 | Akerman et al. | 114/261 |
| 4,883,241 A | * | 11/1989 | Snead | 244/114 R |
| 4,883,388 A | * | 11/1989 | Cherbonnier | 405/195.1 |
| 5,367,973 A | * | 11/1994 | Heggertveit | 114/261 |
| 6,079,668 A | * | 6/2000 | Brown | 244/114 R |
| 7,152,547 B1 | | 12/2006 | Hovland | |
| 7,296,528 B1 | * | 11/2007 | Doyle et al. | 114/258 |
| 7,874,403 B2 | * | 1/2011 | Russell | 184/5 |
| 8,205,831 B2 | * | 6/2012 | Becht et al. | 244/114 R |
| 8,297,552 B2 | * | 10/2012 | Ying | 244/114 R |
| 8,591,171 B1 | * | 11/2013 | Maynard | 415/4.2 |
| 2005/0230537 A1 | * | 10/2005 | Chouery | 244/116 |
| 2008/0131281 A1 | * | 6/2008 | Kariya | 416/183 |
| 2010/0200694 A1 | * | 8/2010 | Tripier-Larivaud | 244/114 R |

* cited by examiner

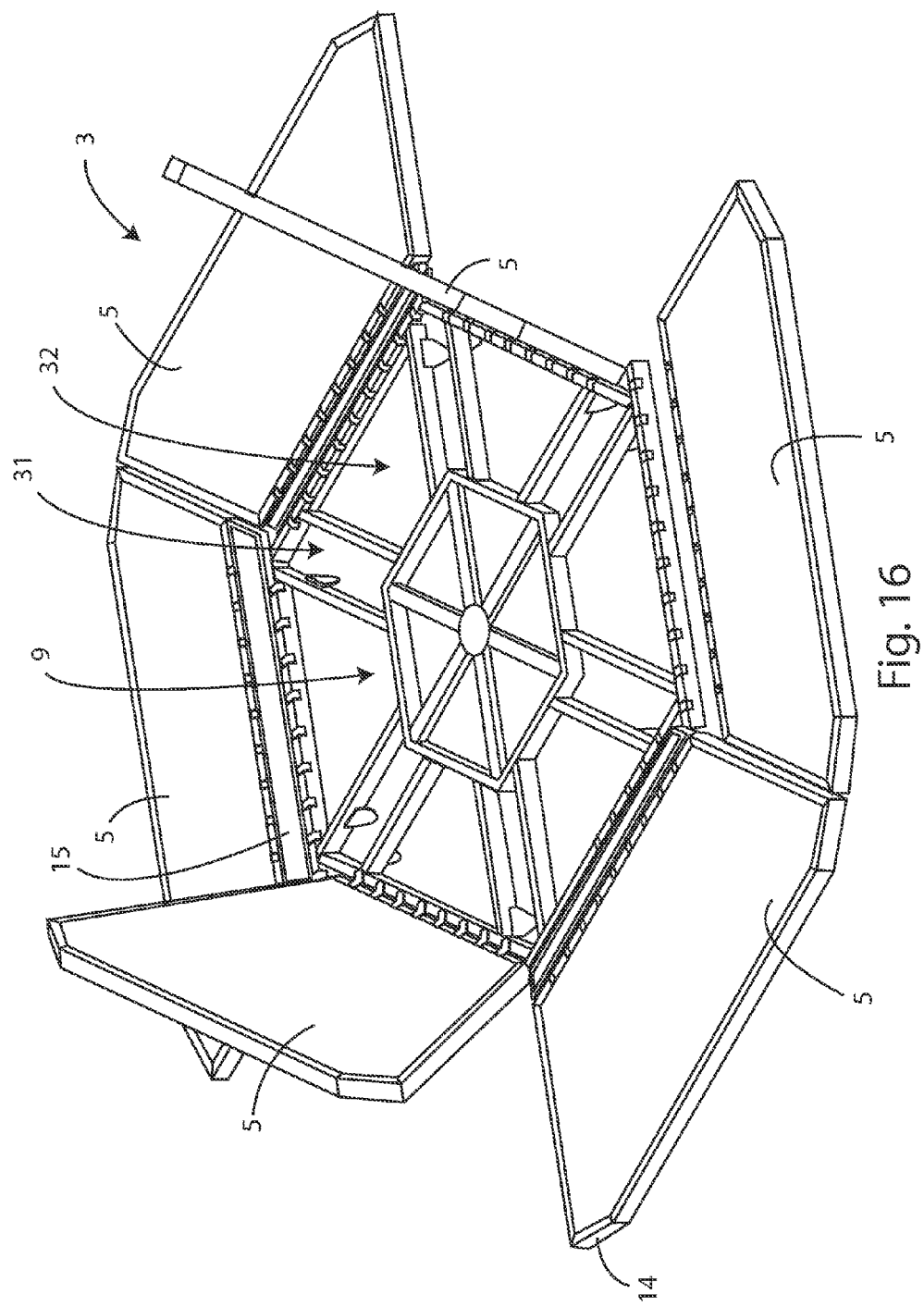

REDUCED DIMENSIONS PLATFORM FOR THE LANDING OF AN AIRCRAFT ON AN ACCESS FACILITY

The present invention concerns a reduced dimensions platform for the landing of an aircraft on an access facility, such as, by indicative but not exclusive way, any boat.

Notoriously, the modern sports boats, which even reach relevant lengths, are provided with a platform allowing the landing of an aircraft, in general a helicopter, for example when it is necessary to transport to another place a person on board or it is desired to put up guests on board when the boat is at open sea.

The platform installed on board of a boat has specific structural and functional features, suitable for meeting the regulations in force, for example, in term of safety for the helicopter pilot during landing: these regulations refer, in particular, to the sizes and visibility of the symbol "H", marked on the top, and the circle which surrounds it.

At present, the landing platforms are generally installed at the boat deck, located in the central part placed at the top, better known in nautical jargon with the term "fly", which houses the command post.

The current construction design of the platforms in question provides that they are firmly fixed in the just indicated position of the boat and constantly occupy the full space allocated to them, thus remaining always visible from the outside in the operating position that allows the proper and safe aircraft landing on them.

The platforms of current installation allow, therefore, the pilot of the aircraft to land in an effective and in certain ways practical manner directly on the access facility, while considering that the manoeuvre is ticklish and complicated by the unstable nature of the support surface, such as the water, on which such a facility is positioned floating, up to the point that it is preferably required that it is performed by a pilot with proven skill and experience.

Nevertheless, the platforms of known type used for the landing of an aircraft on a boat and, more generally, on any access facility, placed for example on a quay in a port, still present the drawback of occupying an excessive and in any case useless space when they do not need to be used.

This is precisely due to the fact that the known platforms remain always permanently in the configuration that allows the landing of the aircraft, even when its actual use is not in place or in any way predictable. The area of the deck of the boat in which the platforms are nowadays installed, yet in itself very narrow, is rather difficult to access up to the point that the freedom of movement of the crew on board is limited, even if only minimally.

In addition, the fixed position in the final configuration in which the landing platforms of the know art constantly remain inevitably causes that they are subject to accidental impacts not only by other moving structures, detrimental both for the ones and the others, but even by people, still dangerous or hazardous for the physical safety of the latter.

The present invention seeks to overcome the aforesaid drawbacks of the prior art.

In particular, primary purpose of the invention is to provide a platform for the landing of an aircraft on an access facility which, in non-use conditions, presents overall dimensions smaller than equivalent platforms of known type, while remaining also visible at the outside.

Within such a requirement, it is a first task of the present invention to devise a reduced dimensions platform for the landing of an aircraft on an access facility which, especially in non-use conditions, allows to access the space adjacent to it more easily and quickly than what happens with the known platforms.

It is a second task of the invention to increase compared to the known art known the freedom of movement of the crew or, more generally, people even at the area of an access facility where a platform for the landing of an aircraft is installed.

It is another task of the invention described herein to increase compared to the state of the art the safety of people accessing the area where, in a given facility, a platform for the landing of an aircraft is installed.

It is a further task of the present invention to preserve to an extent greater than prior art a platform for the landing of an aircraft on a facility from accidental impacts with other structures moving next to it.

It is a last but not least purpose of the invention to indicate an active platform for the landing of an aircraft on an access facility that can be effectively and conveniently installed in any area of the access facility, in case the latter is distinguished by areas of various and different composition, such as a boat.

Said purposes are achieved through a reduced dimensions platform for the landing of an aircraft on an access facility according to the attached claim 1, as hereinafter referred for the sake of brevity.

Other constructive features of detail of the active platform of the invention are set forth in the dependent claims.

Advantageously, when not required for use, the platform of the invention presents dimensions smaller than the platforms of known type since the landing footboard is divided into a central body and a series of peripheral panels (or petals) which, in such a condition, are contained within the dimensions defined by the central body itself.

Still advantageously, the platform object of the present invention, mostly in non-use conditions, allows to access the space surrounding it in a manner more practical, easier and quicker than the known platforms.

Such an advantage is of not-negligible relevance in the light of the fact that, in most cases, the area of the access facility in which a platform of the type here at issue is placed is by its very nature rather narrow.

Equally advantageously, at least in non-use conditions, the platform of the invention averts greatly than the platforms of the known art the risks of accidental impacts by other moving structures or people, always harmful and dangerous both for the structures and for people possibly involved.

This can be seen, for example, when the access facility is a boat, during the maintenance operation of the latter when moored or when the crew spends relax time on it.

In advantageous manner, moreover, the reduced dimensions platform of the invention can be installed in any area of the access facility; in particular, if the access facility is made up of a boat, the platform according to the invention can be positioned either at prow, at stern or on the command deck (fly).

Said purposes and advantages, as well as others that will emerge later on, will be more evident from the following description, relating to a preferred embodiment of the active platform of the invention, given by indicative and illustrative, but not limiting, way with reference to the attached drawing tables, where:

FIGS. 13-16 are assonometric views of intermediate positions distinct and consecutive each other, subsequent to the first position of FIG. 10, of the landing footboard of the platform of FIGS. 1-5, in the passage from the rest position to the final operating final.

The reduced dimensions platform of the present invention is shown in applicative conditions in FIGS. 1-5, where it is globally indicated with 1.

It is suitable, indeed, for the landing of an aircraft, usually a helicopter, mostly on a boat B such as a yacht or a super yacht, visible in these FIGS. 1-5.

It has to be observed that the platform 1 comprises a support base, which is denoted as a whole by 2 and is fixed to a reference surface P, for instance defined at the prow of the boat B, as well as a landing footboard, on the whole numbered with 3, superiorly connected with the support base 2 and adapted to receive the aircraft.

Figure 6:
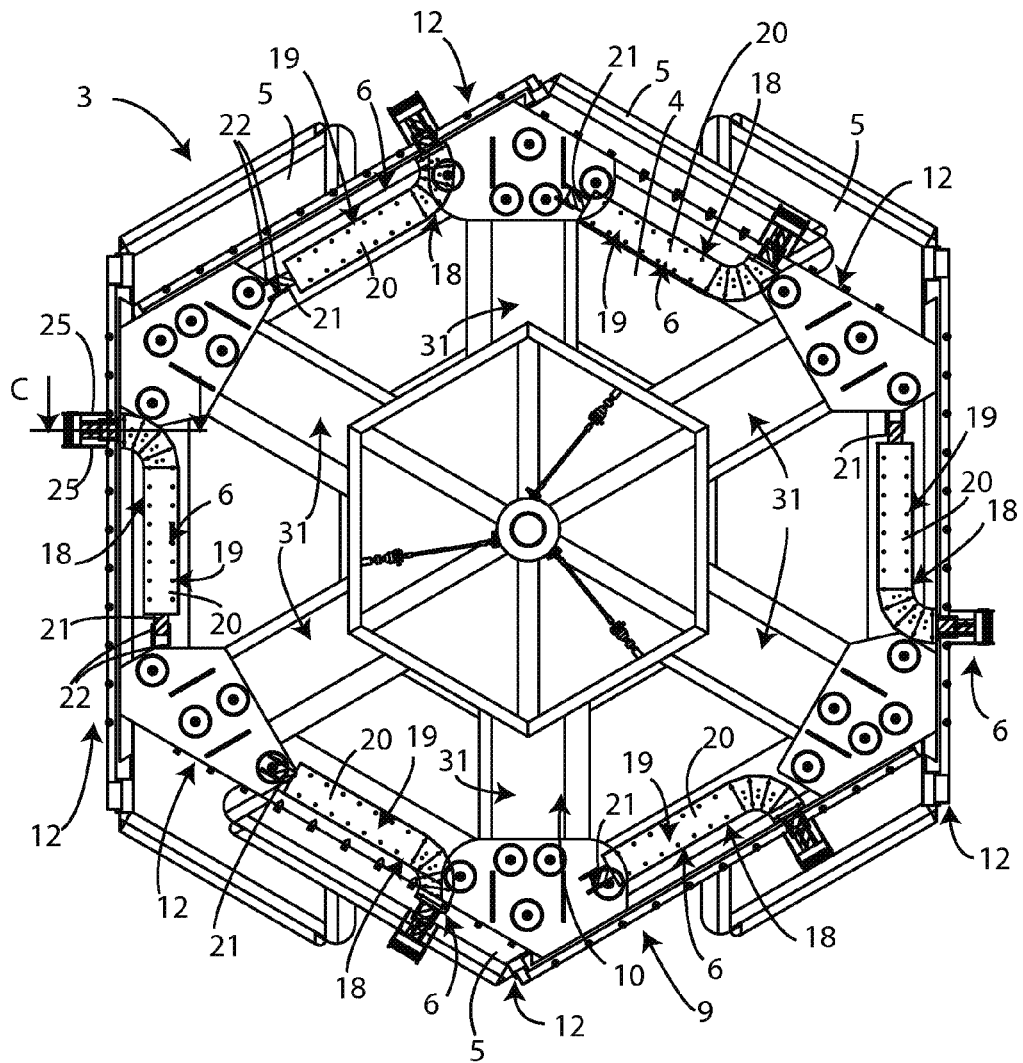
FIG. 6 is a plan view from the bottom of the landing footboard of the platform of FIG. 1, in the rest position.

According to the invention, said landing footboard 3 includes a central body 4, coupled with the support base 2, and a plurality of peripheral panels, each indicated with 5, operatively connected with drive means, overall indicated with 6 and visible in FIG. 6, which move the peripheral panels 5 from/to a rest position, in which the peripheral panels 5 themselves are contained within the dimensions of the central body 4, to/from an operating position in which the peripheral panels 5 laterally project from the central body 4 and are combined and side-by-side each other so as to be coplanar with each other and the central body 4 and make the landing footboard 3 ready to receive the aircraft.

More specifically, the peripheral panels 5 are two by two opposite each other and arranged symmetrically with respect to a generic central axis that divides in half the central body 4.

Figure 5:
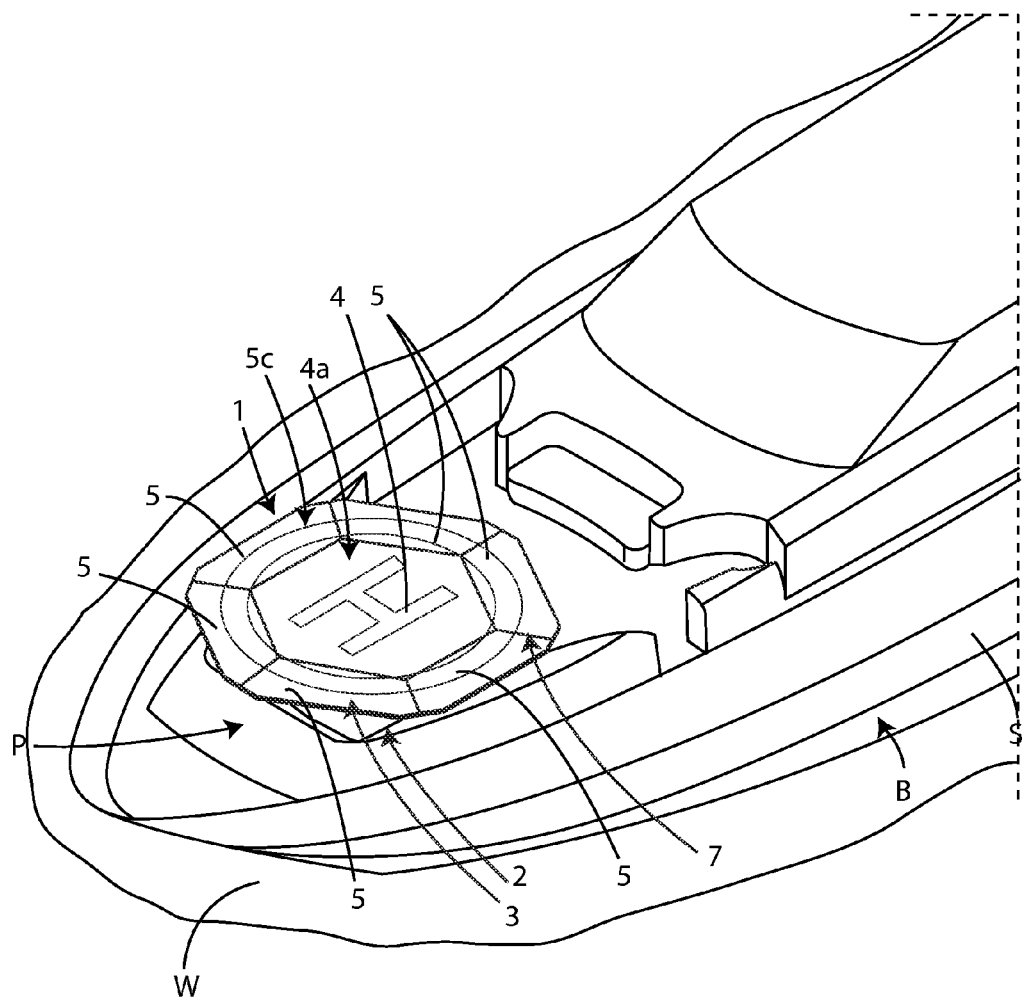
Figure 9:
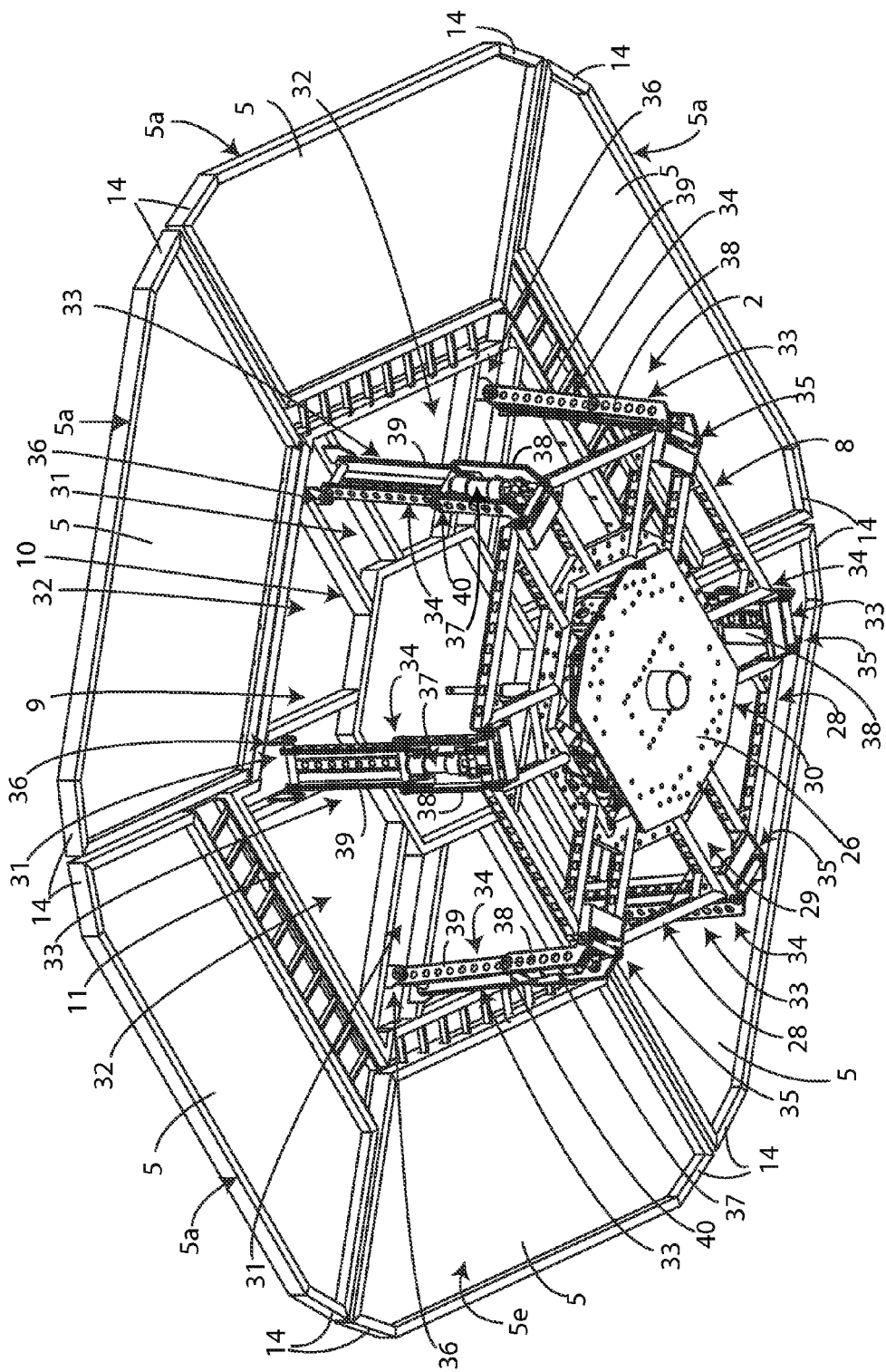
FIG. 9 is a simplified and partial assonometric view of the platform of FIG. 5, in the final operating position.

In the previously introduced operating position, the peripheral panels 5 create an annular structure, overall indicated with 7 and visible in FIGS. 5 and 9, which surrounds the central body 4 in order to place the landing footboard 3 in the final operating condition, suitable for the landing of the aircraft.

In a preferred but not binding manner, the support base 2 of the platform 1 comprises:

a basic framework, on the whole indicated with 8, suitable to insist on the aforesaid reference surface P of the access facility B;

a net frame 9, superiorly coupled with the basic framework 8 and composed of an inner part 10, which defines a substantially horizontal plane and firmly supports the central body 4, and a perimetric wall 11 orthogonally projecting from the inner part 10 in order to laterally delimit the central body 4.

Preferably but not necessarily, the net frame 9, whose detailed construction shape will be further on explained, presents in plan view a hexagonal profile, as it can be derived from FIG. 6.

In the case here described, the peripheral panels 5 are, by way of example, coupled with the central body 4 and present shape, sizes and profile equal each other.

Figure 7:
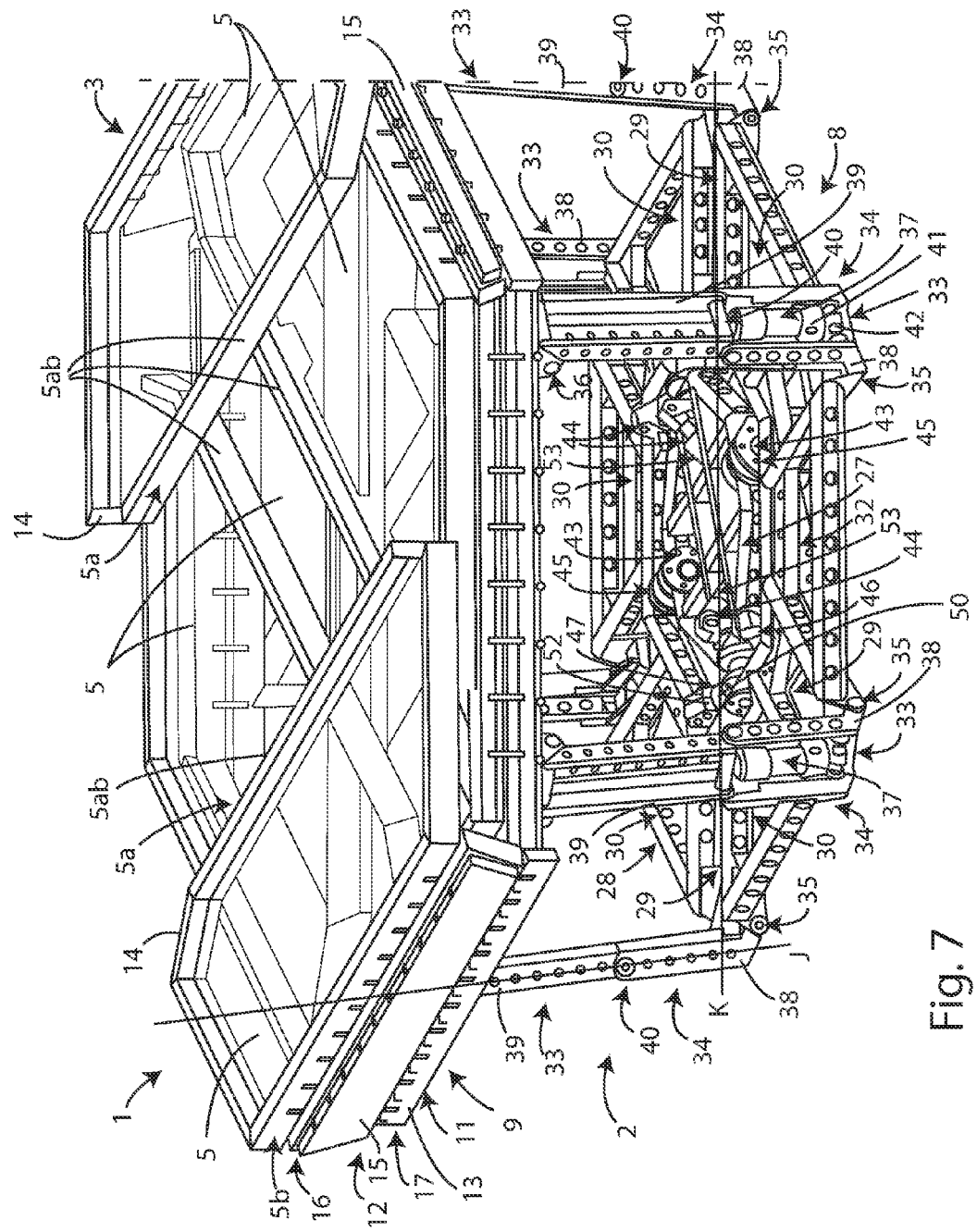
FIG. 7 is a simplified and truncated assonometric view of the platform of FIG. 2, in an intermediate position between the rest position and the final operating position.
Figure 8:
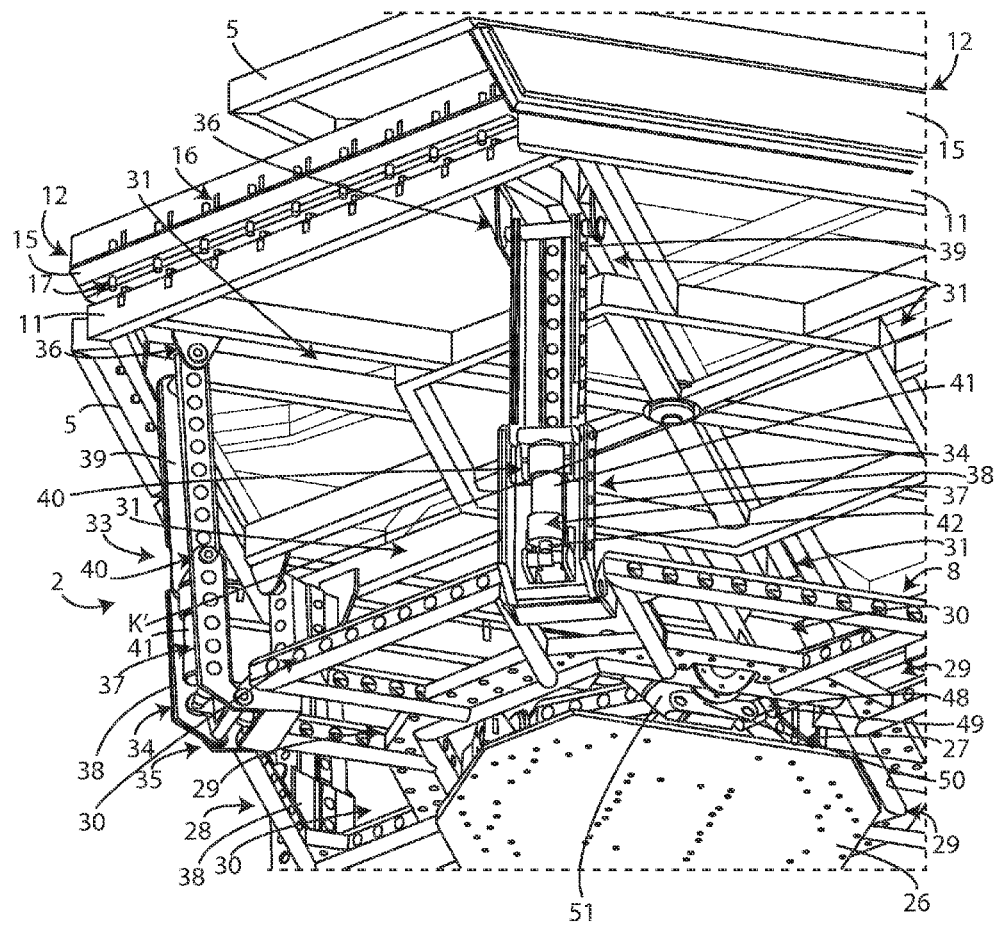
FIG. 8 is an enlargement of a glimpse of FIG. 7.

Particularly, FIGS. 7 and 8 show that each of the peripheral panels 5 is revolvingly coupled with the perimetric wall 11 of the net frame 9 of the support base 2 through rotation means, overall marked with 12.

These rotation means 12 cooperate with the drive means 6 in such a way that, in the rest position, the peripheral panels 5 are positioned above the central body 4 so that the free edge 5a of a first peripheral panel 5 faces for a front section 5ab the free edge 5a of a second peripheral panel 5 directly opposite to and spaced apart from the first panel 5.

In the operating position, however, the rotation means 12 cooperate with the drive means 6 in order to position the peripheral, panels 5 laterally to the perimetric wall 11 of the net frame 9, so that the free edge 5a of the peripheral panels 5 faces outwardly and the outer surface 5c of the peripheral panels 5 is coplanar with the outer wall 4a of the central body 4.

Each of the peripheral panels 5 is also equipped with a limit ledge edge 5b coupled through the rotation means 12 with a linear strap 13 of the perimetric wall 11.

Since the net frame 9 presents in the specific case, by purely illustrative way, the aforesaid hexagonal profile, the landing footboard 3 comprises three pairs of peripheral panels 5, suitable to be sequentially moved by the drive means 6 from/to the rest position, in which the peripheral panels 5 are arranged two by two on the same plane, parallel to the plane defined by the central body 4, as FIG. 7 particularly shows, to/from the operating position in which the peripheral panels 5 are mutually side-by-side and coplanar each other in order to form the annular structure 7, as already stated clearly highlighted in FIG. 9.

From an essentially constructive standpoint, it is highlighted that the hexagonal profile of the net frame 9 implies the presence of six linear straps 13 coupled with as many peripheral panels 5, each of which preferably has in plant view a substantially isosceles trapezium-shaped profile with vertexes between the major base and the sloping sides rounded, in this case by a linear stretch 14, as FIGS. 7 and 9 better show.

It is understood that in other embodiments of the invention, not shown, the platform could include a number of pairs of peripheral panels which differs from that one just described, while maintaining the technical specifications outlined for the platform 1 with the exception of the profile in plant view of the peripheral panels, which will vary accordingly with respect to the trapezoidal one previously indicated.

Figure 10:
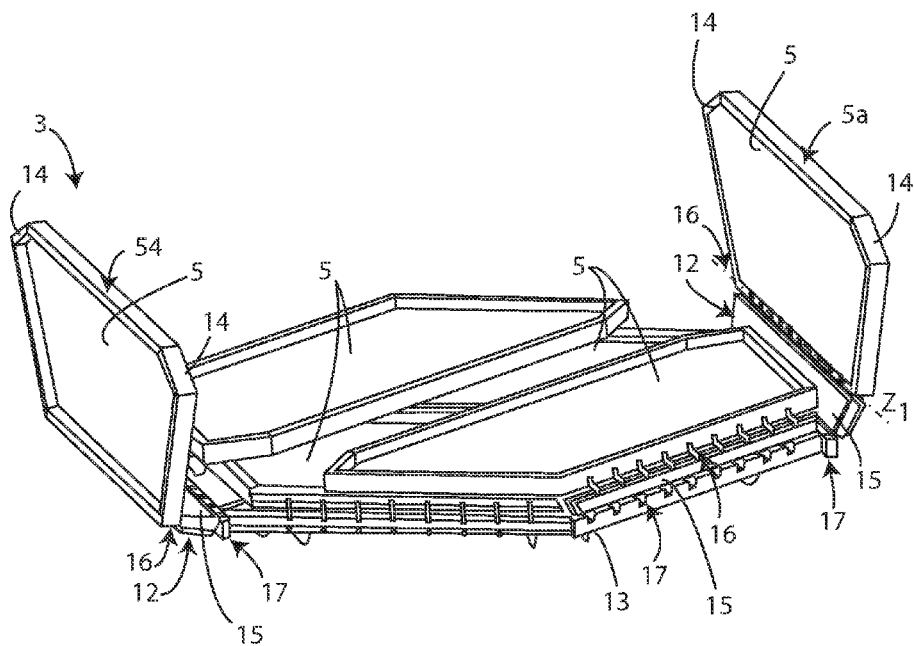
FIG. 10 is a simplified and partial assonometric view of a first intermediate position of the landing footboard of the platform of FIGS. 1-5 at the beginning of the passage from the rest position to the final operating position.
Figure 11:
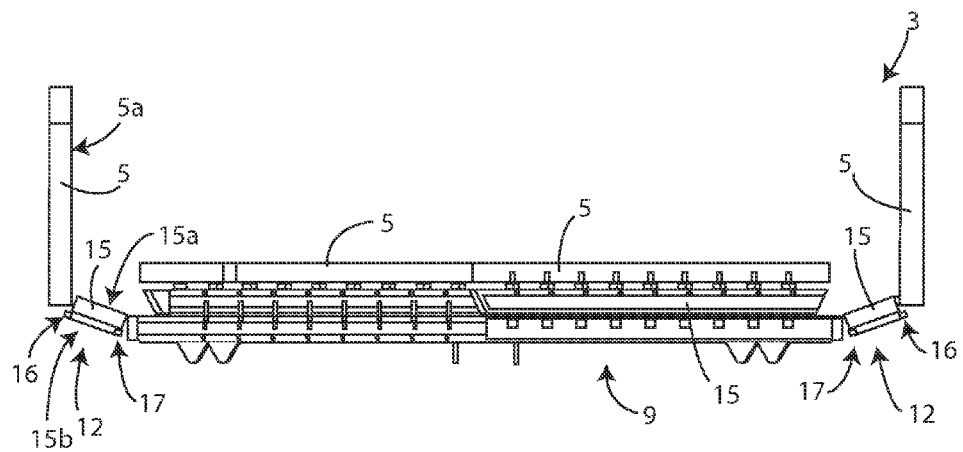
FIG. 11 is a side view of FIG. 10.
Figure 12:
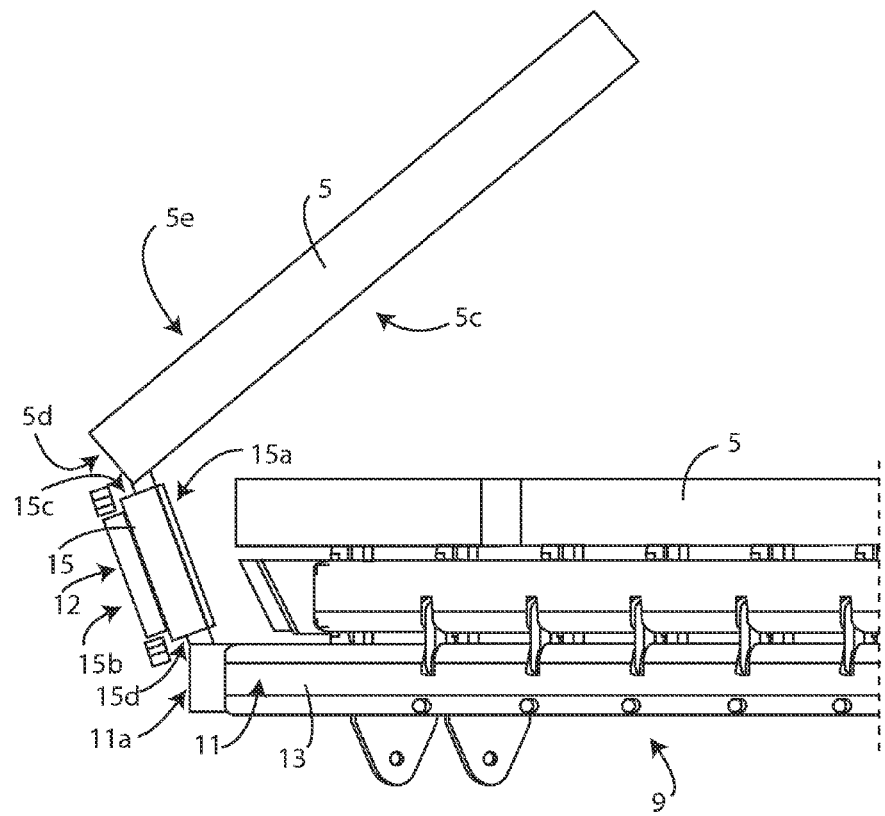
FIG. 12 is a truncated enlargement of FIG. 11.

As better visible in FIGS. 10-12, the rotation means 12 include in purely preferred way:

an intermediate bar 15 provided with two flat side faces 15a, 15b opposite each other, a first side edge 15c cooperating with one of the peripheral panels 5 and a second side edge 15d, opposite to the first edge 15c and cooperating with the perimetric wall 11 of the net frame 9 so as to perfectly conjugate to the outer edge 11a of the perimetric wall 11 itself in the operating position;

a plurality of first pivot hinges 16, arranged at the first side edge 15c of the intermediate bar 15 and at a bounded edge 5d of the peripheral panels 5 in order to bind the intermediate bar 15 to the peripheral panels 5;

a plurality of second pivot hinges 17 arranged at the second side edge 15d of the intermediate bar 15 and at the outer edge 11a of the perimetric wall 11 of the net frame 9 in order to bind the intermediate bar 15 to the perimetric wall 11 thereof.

Figure 13:
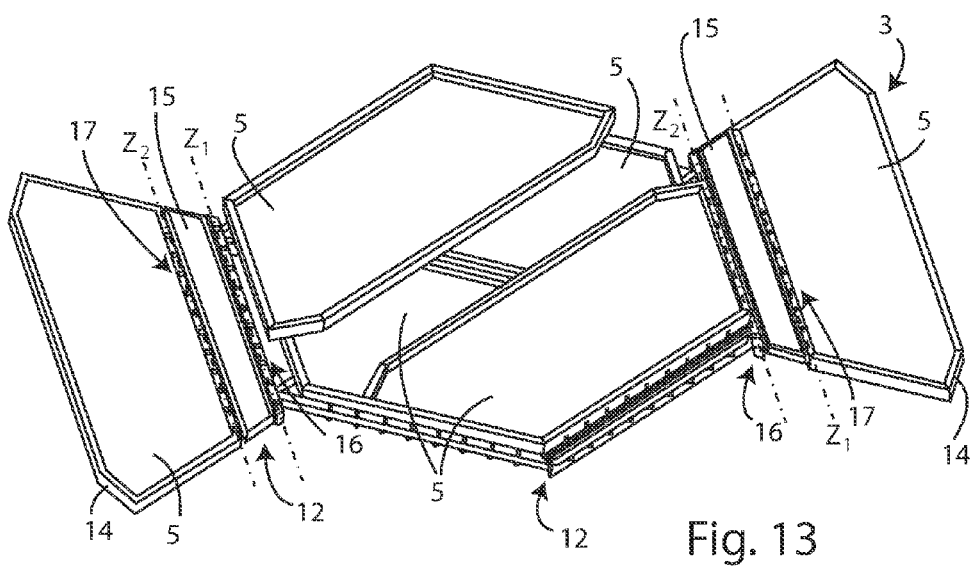

FIG. 13 shows that the first pivot hinges 16 are aligned each other along a first rotation axis $Z_1$, while the second pivot hinges 17 are aligned along a second rotation axis $Z_2$, parallel to the first rotation axis $Z_1$.

According to the preferred embodiment described herein of the invention, the drive means 6 include a plurality of articulated actuators 18, visible in FIG. 6, each of which is coupled with the net frame 9 and one of the peripheral panels 5.

More specifically, each articulated actuator 18 is placed below the net frame 9 as well as, in the operating position, the peripheral panels 5.

Each articulated actuator 18 advantageously comprises:
a linear actuator 19 equipped with a protection cylinder 20, arranged inferiorly close to the inner part 10 of the net frame 9, and a piston 21, sliding inside the cylinder 20 and provided with one end fixed to a pair of shaped brackets 22 inferiorly projecting from the inner part 10 of the net frame 9;
elastic flexible means, on the whole numbered with 23, coupled with the piston 21 through a joint element, not visible, and with the lower wall 5e of each of the peripheral panels 5 through a pair of articulation levers 24 facing, spaced apart and opposite each other.

The articulated actuator 18 of the platform 1 in question allows to move according to specific and various directions structural elements, such as in this case the peripheral panels 5, arranged in narrow, difficult to access and small sizes places.

All this without using transmission means, such as angular driving gears, chains, sprockets, pulleys or belts, typical of the known implementation systems in similar conditions.

The articulated actuator 18, indeed, thanks to the flexible elastic means 23 articulated in respect to the linear actuator 19, moves the peripheral panels 5, whose barycentre defines a skew axis, not directly aligned with the operating longitudinal axis of the piston 21 of the linear actuator 19, allowing to achieve not-negligible advantages during design and installation of the components of the platform 1.

These advantages reflect in an assembly time and cost reduction which absorbs the inevitable higher cost associated with the articulated actuator 18, understood as finished product.

More in detail, the joint element includes a first part and a second part, movable reciprocally one relative to the other on a plane, in such a way as to give to the flexible elastic means 23 an angled position with respect to the operating longitudinal axis of the piston 21.

Preferably but not exclusively, the elastic means 23 comprise a helical spring, provided with a first end, coupled with a support bush, not shown for the sake of exhibition simplicity, integral with the second part of the joint element, and with a second end associated with a support counter-bush, not visible too, integral with the articulation levers 24 inferiorly coupled with the peripheral panels 5 to be moved.

In the case described, the drive means 6 include a number of articulated actuators 18 exactly equal to the number of peripheral panels 5 to be moved; it is, however, understood that in other embodiments of the invention, not represented, the number of articulated actuators could be different from the number of peripheral panels to be moved, especially depending on the mass of the latter.

Figure 6A:
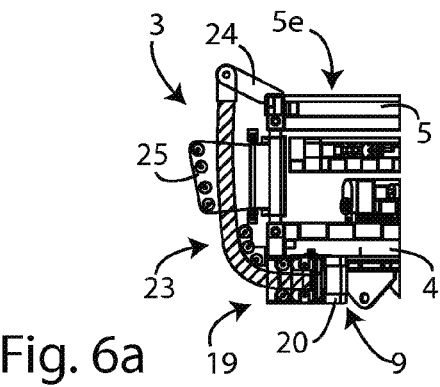
FIG. 6a is the view of FIG. 6 according to the cutting plane C-C.
Figure 6B:
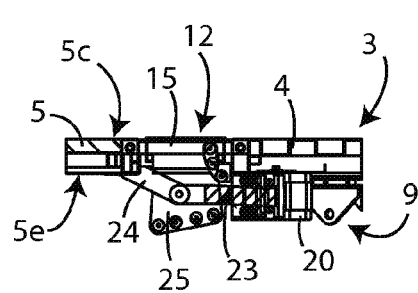
FIG. 6b is the view of FIG. 6a in the final operating position of the platform of FIG. 5.

The landing footboard 3 of the platform 1 also includes a pair of guide plates 25 facing and spaced apart each other, fixed to the lower flat face 15b of the intermediate bar 15, as it is noted in the sections of FIGS. 6a and 6b.

The guide plates 25 are useful during moving of the peripheral panels 5 from/to the rest position to/from the operating position because they maintain stable the conformation of the flexible elastic means 23 when the drive means 6 exert a thrust or traction force on the peripheral panels 5.

FIGS. 7-9 show that, at illustrative and not exclusive title, the basic framework 8 includes:
a reference plate 26 which is properly fixed to the reference surface P of the access facility B;
a central frame 27, superiorly coupled with the reference plate 26 and defining a lower plane parallel to and spaced apart from the reference plate 26;
a perimetrical frame 28 surrounding the central frame 27, with which is coupled so as to be coplanar with it, and equipped with a cantilevered peripheral portion.

The perimetrical frame 28 preferably presents a stellar profile, defining a series of perimetric seats 29 equal each other, two by two opposite and radially facing outwardly, uniformly distributed on the perimetrical frame 28 and staggered each other by trapezoidal protrusions 30 equal each other and two by two opposite each other.

In detail, the perimetric seats 29 are six in number, distributed substantially in accordance with the vertexes of a hexagon on the perimetrical frame 28 and along radial directions K, as well as the trapezoidal protrusions 30 of course.

In turn, the net frame 9 presents a plurality of closed profile peripheral compartments 31, uniformly distributed on it according to the vertexes of a hexagon and along radial lines K' parallel to the radial directions K, as well as staggered each other by trapezoidal sectors 32.

Even the peripheral compartments 31 and the trapezoidal sectors 32 are six in number in the case at issue, equal to the number of perimetric seats 29 and trapezoidal protrusions 30.

In the non-use position of the landing footboard 3, the peripheral compartments 31 and the trapezoidal sectors 32 of the net frame 9 are facing respectively to the perimetric seats 29 and the trapezoidal protrusions 30 of the perimetrical frame 28.

In FIGS. 7-9 it is observed that, advantageously, the active platform 1 also comprises translation means, on the whole indicated with 33, interposed between the basic framework 8 and the landing footboard 3 in order to reciprocally connect them.

The translation means 33 are operatively connected with the landing footboard 3 in order to move it to/from a non-use position, in which the landing footboard 3 re-enters with respect to the access facility B along a vertical axis Z orthogonal to the water surface W, while remaining arranged under the open sky and accessible to the user, to/from a middle position in which the landing footboard 3 completely protrudes from the access facility B along such a vertical axis Z, becoming available for the landing of the aircraft.

More specifically, the just cited middle position of the landing footboard 3 precedes the stage at which the peripheral panels 5 take the operating position yet described.

In the non-use position, the landing footboard 3 totally re-enters, along the vertical axis Z, in the overall dimensions defined by the hull S of the boat B in such a way that the landing footboard 3 itself can be used as sun deck landing by the users, standing or lying down.

Figure 1:
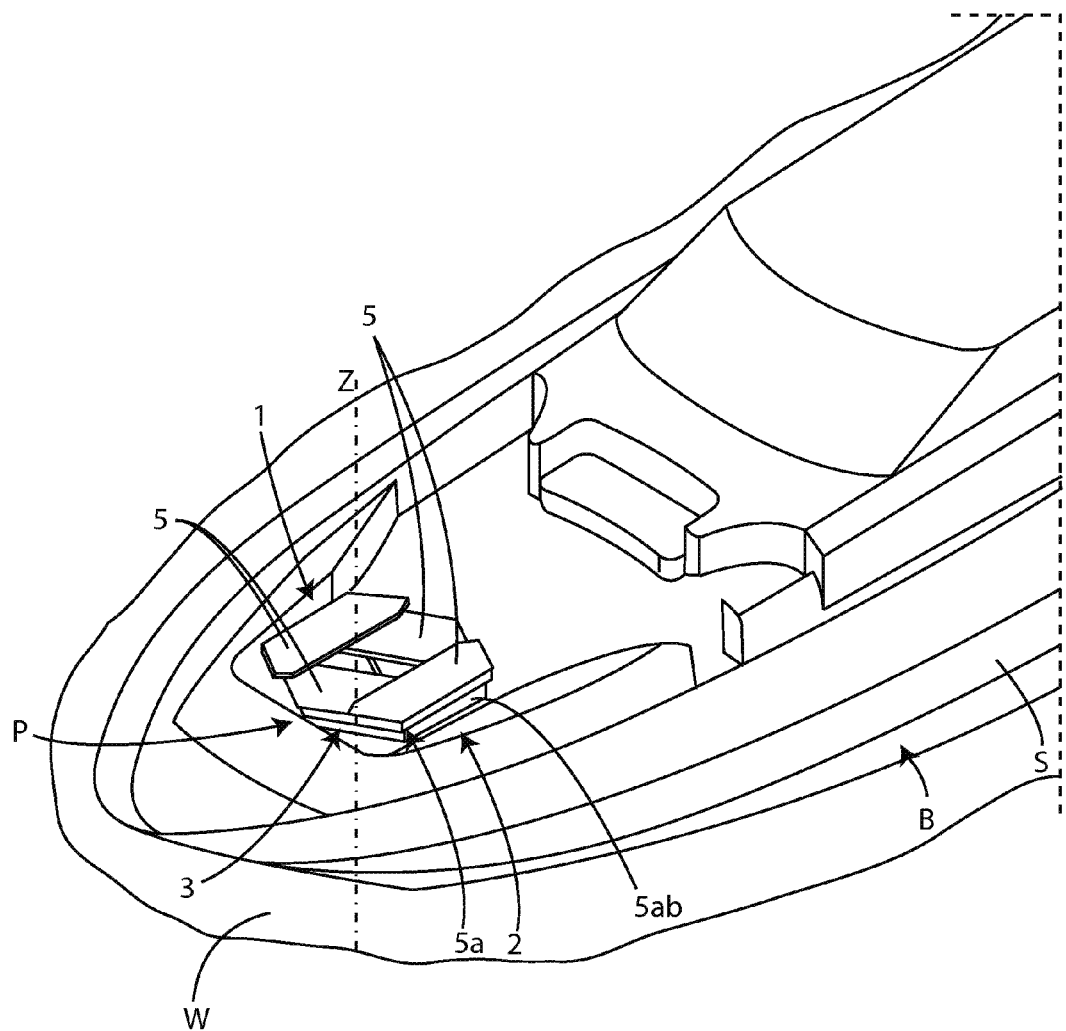
FIGS. 1-5 are assonometric applicative views of positions different and consecutive each other of the platform of the invention while passing from the rest position to the final operating position.
Figure 2:
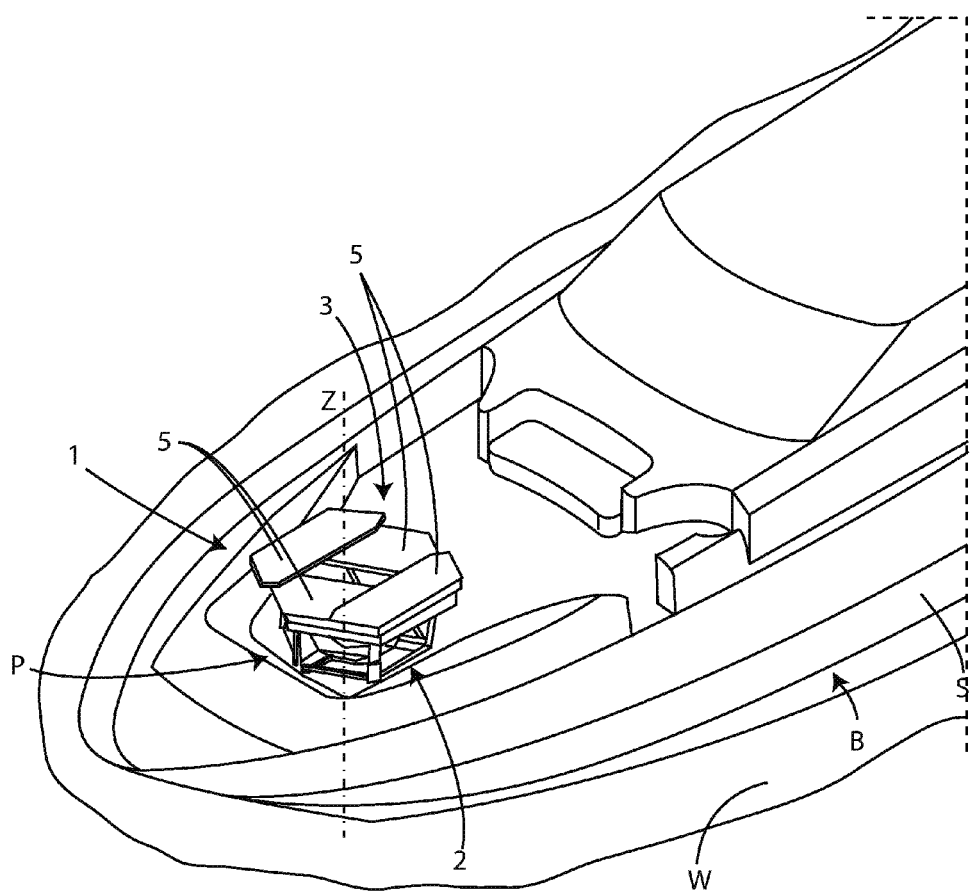

In the non-use position of the landing footboard 3, shown in FIGS. 1 and 6, the translation means 33 are also basically contained into the perimetric seats 29 of the perimetrical frame 28 arranging themselves along a radial direction K.

Instead, in the middle position of the landing footboard 3, shown in FIGS. 7-9, the translation means 33 protrude upwardly along an oblique direction J which forms with the radial direction K an angle slightly greater than the right angle.

Therefore, the platform 1 of the invention re-enters almost entirely, along the canonical three axes X, Y and Z, in the overall dimensions of the hull S of the boat B, when placed in the non-use position, significantly although within certain limits reducing its overall dimensions while keeping the landing footboard 3 at sight and exploitable.

Thanks also to the translation means 33, the platform 1 of the invention, when in non-use position, then averts more than the platforms of the known art the risks of accidental impacts against it of other moving structures or people.

In preferred though not absolute way, the translation means 33 include:
- a plurality of articulated arms, each indicated on the whole with 34 and coupled, on one hand, with the perimetrical frame 28 through first constraint means, as a whole numbered with 35 and arranged at the perimetric seats 29 and, on the other hand, through second constraint means, on the whole indicated with 36, with the net frame 9 which supports from the bottom the landing footboard 3 and which, in the non-use position, is parallelly and superiorly arranged close to the perimetrical frame 28 along a substantially horizontal plane;
- a plurality of linear actuators, each indicated with 37, cooperating with the relative articulated arms 34 in order to move the landing footboard 3 between the non-use position and the middle position and vice versa.

The preferred embodiment yet described of the perimetrical frame 28 thus determines that the articulated arms 34 and the linear actuators 37 are six in number, always by way of indication.

Again FIGS. 7-9 show that, in a preferred but not exclusive manner, each articulated arm 34 comprises:
- a first protection plate 38 which contains one of the linear actuators 37 and is revolvingly connected with the perimetrical frame 28 through the first constraint means 35;
- a second protection plate 39 revolvingly connected with the net frame 9 through the second constraint means 36 and with the first protection plate 38 through third constraint means, generally referred with 40.

In the rest position of the landing footboard 3, the second plate 39 is, therefore, contained into the first plate 38 so that each linear actuator 37 is enclosed between these protection plates 38, 39.

Preferably, every linear actuator 37 is provided with an outer casing 41, fixed to the bottom of the first plate 38, and a strength stem 42 connected with a support plaque, not shown for ease of exposition, contained into each perimetric seat 29 and integral with the trapezoidal protrusions 30 of the perimetrical frame 28.

In the non-use position of the landing footboard 3, the strength stem 42 axially protrudes from the outer casing 41 up to the end-of-stroke, in such a way that the longitudinal axis of the strength stem 42 coincides with the radial direction K.

In the middle position of the landing footboard 3, the strength stem 42 re-enters within the outer casing 41 up to the end-of-stroke, so that the longitudinal axis of the strength stem 42 coincides with the oblique direction J.

The reduced dimensions platform 1 of the invention also includes, in advantageous way, compensation and levelling means, totally reported as 43, operatively connected with moving means, on the whole numbered with 44, so as to constantly keep the landing footboard 3 on a substantially horizontal plane when atmospheric agents, fluid masses and/or adjacent structures interfere with the access facility B.

In this case, the compensation and levelling means 43 act, due to the operation of the moving means 44, in such a way as to keep the landing footboard 3 in any case parallel to the waterline W of the boat B.

Moreover, since the access facility is a boat B, the atmospheric agents are, for example, constituted by wind or strong rain, while the fluid masses are represented by the wave motion of a sea or an agitated lake.

As it can be seen in FIGS. 7-9, the compensation and levelling means 43 and the moving means 44 are in this case coupled with the basic framework of the support base 2 in order to be below the landing footboard 3.

In practice, the compensation and levelling means 43 connect on one hand the central frame 27 with the reference plate 26 and, on the other hand, the perimetrical frame 28 with the central frame 27.

In the preferred embodiment described herein, the compensation and levelling means 43 include two main mechanical couplings of the fifth wheel/shaft type, each of which consisting of:
- a first rotation fifth wheel, not shown for ease of reference, fixed to the reference plate 26 through anchoring means, overall reported with 45;
- a first counter-fifth wheel, not shown too, directly facing and opposite to the first fifth wheel, revolvingly coupled from one side with the central frame 27 and on the other side with the first fifth wheel through a first articulation pin, not identified in the figures, which allows the oscillation of the landing footboard 3 around the longitudinal axis X passing through the centre of the central frame 27.

In particular, the first fifth wheel/shaft coupling is separated by means of the central frame 27 from the second fifth wheel/shaft coupling.

The oscillation of the landing footboard 3 allowed by the first articulation pin describes acute angles $\alpha$ positive and negative with respect to a reference plane $\Pi$ parallel to the reference surface P and dividing by half the central frame 27.

This acute oscillation angle $\alpha$ of the landing footboard 3 around the longitudinal axis X takes values typically between 0° and 5°.

In advantageous but not binding manner, the compensation and levelling means 43 also include a pair of auxiliary mechanical couplings of the fifth wheel/shaft type, each of which consisting of a second rotation fifth wheel, still not shown, fixed to the perimetrical frame 28, and a second counter-fifth wheel, not shown, directly facing and opposite to the second fifth wheel.

Moreover, the second counter-fifth wheel is revolvingly coupled on one side with the central frame 27 and on the other side with the second fifth wheel through a second articulation pin, not visible, which allows the landing footboard 3 to oscillate around a transverse axis Y passing through the centre of the central frame 27 orthogonally to the longitudinal axis X.

Similarly to what said above for the main fifth wheel/shaft couplings, even the auxiliary fifth wheel/shaft couplings are mutually opposed and separated by the central frame 27.

The oscillation of the landing footboard 3 allowed by the second articulation pin describes angles $\beta$ positive and negative in respect of the reference plane $\Pi$: the value of such an acute angle $\beta$ is preferably between 0° and 2°.

Depending on the arrangement just described, the main fifth wheel/shaft couplings and the auxiliary fifth wheel/shaft couplings are equally spaced apart each other according to the vertexes of a square.

Since the access facility chosen, by preferred but not limited way, to give course to the current description is a boat B, the longitudinal axis X and the transverse axis Y respectively represent the roll axis and the pitching axis of the boat B itself.

It is clear in any case that, in other embodiments of the invention, not shown, the main fifth wheel/shaft couplings of the compensation and levelling means, properly designed, could put in rotation the landing footboard around the transverse pitching axis; conversely, the auxiliary fifth wheel/shaft couplings will allow the rotation of the landing footboard around the longitudinal roll axis of the boat.

As far as the moving means 44 are concerned, FIGS. 7-9 indicate that they preferably include:
- a pair of first linear actuators 46, symmetrically arranged each other with respect to the centre of the central frame 27, interposed between the latter and the perimetrical frame 28;
- a pair of second linear actuators 47, symmetrically arranged each other with respect to the centre of the central frame 27, placed between the latter and the perimetrical frame 28.

More specifically, every second linear actuator 47 is facing to and cooperates with one of the first linear actuators 46 in order to rotate the landing footboard 3 around the longitudinal axis X through the compensation and levelling means 43.

In particular, the first linear actuators 46 face the second linear actuators 47 at two sides of the central frame 27 placed symmetrically with respect to the longitudinal axis X.

Every first linear actuator 46 is provided with an outer cylinder 48 bounded to the perimetrical frame 28, and a thrust piston 49 bounded to a first support plate 50, coupled with the perimetrical frame 28, and to a second support plate, not visible in the attached figures, coupled with the central frame 27 and facing the first support plate 50.

In turn, each of the second linear actuators 47 is provided with an outer cylinder 51, bounded to the support plates (one indicated with 50) facing each other, and a thrust piston 52 fixed to perimetrical frame 28 so that the effect of the thrust piston 52 of the seconds linear actuators 47 balances the effect of thrust piston 49 of the first linear actuators 46.

In operating conditions, the thrust piston 49 and 52 of respectively the first linear actuators 46 and the second linear actuators 47 slides along a linear axis M oblique with respect to the plane a defined by the reference plate 26 and parallel to the longitudinal axis X when projected onto such a plane a of the reference plate 26.

At preferential title, the moving means 44 comprise a pair of third linear actuators 53 facing and cooperating each other, symmetrically arranged with respect to the longitudinal axis X and coupled on one side with the central frame 27 and on the other side with the reference plate 26 according to the transverse axis Y in order to rotate the landing footboard 3 around such a transverse axis Y always through the compensation and levelling means 43.

More precisely, one of the third linear actuators 53 is provided with an outer cylinder, not shown but visible in FIG. 7, bounded to the central frame 27, and a thrust piston, not shown but invisible in FIG. 7, bounded to a pair of first brackets facing and spaced apart each other (not shown but still visible in FIG. 7), protruding from the reference plate 26 to which are fixed.

On the other hand, the other of the third linear actuators 53 is provided with an outer cylinder, not shown but invisible in FIG. 7, bounded to a pair of second brackets facing and spaced apart each other (not shown but invisible in FIG. 7), symmetrically arranged to the first brackets with respect to the longitudinal axis X and protruding from the reference plate 26 to which are fixed.

The second of the third linear actuators 53 is also equipped with a thrust piston, not shown but invisible in FIG. 7, bounded to the central frame 27 in such a way that the effects of the thrust pistons of the third linear actuators 53 balance each other.

FIG. 7 highlights that the third linear actuators 53 are contained within the perimeter of the central frame 27, as well as the bore of the outer cylinders of the third linear actuators 53 is greater than the bore of the outer cylinders 48 and 51 of the first linear actuators 46 and the second linear actuators 47.

Advantageously, the active platform 1 comprises detection means, not represented and constituted for example by contact sensors, electrically connected with control means and cooperating with the perimetrical frame 28 in order to determine deviations of the landing footboard 3 from the horizontal position when atmospheric agents, fluid masses and/or adjacent structures interfere with the boat B.

The drive means 6, the translation means 31, the moving means 44 and/or the detection means are electrically connected with control means available to the user, not shown and constituted, for example, by a hydraulic gearcase comprising a central processing and control unit; these control means allow a proper automatic management of all the movements of the above indicated organs and devices that make up the platform 1.

Operatively, the platform 1 of the invention is in the specific case installed at prow P of the boat B, as shown in FIG. 1, where the platform 1 is not in the conditions to allow the landing of the aircraft but, with proper mattresses, is advantageously transformed into a sun deck and support landing accessible in full safety by the people which however allows its use.

In such a situation, indeed, the platform 1 re-enters with respect to the hull S of the boat also along the vertical axis Z.

If the aircraft must land on the boat B, the control means firstly operate the activation of the linear actuators 37 of the translation means 33, which move the articulated arms 34 in order to align each other along the oblique direction J and consequently raising the landing footboard 3, bringing it to the middle position of FIGS. 2, 7, 8 and 9 protruding from the hull S of the boat B along the vertical axis Z.

Subsequently, the operator or the shipowner, always acting from the control means, drives the articulated actuator 18 of the driving means 6, thereby causing the opening of the peripheral panels 5.

Figure 3:
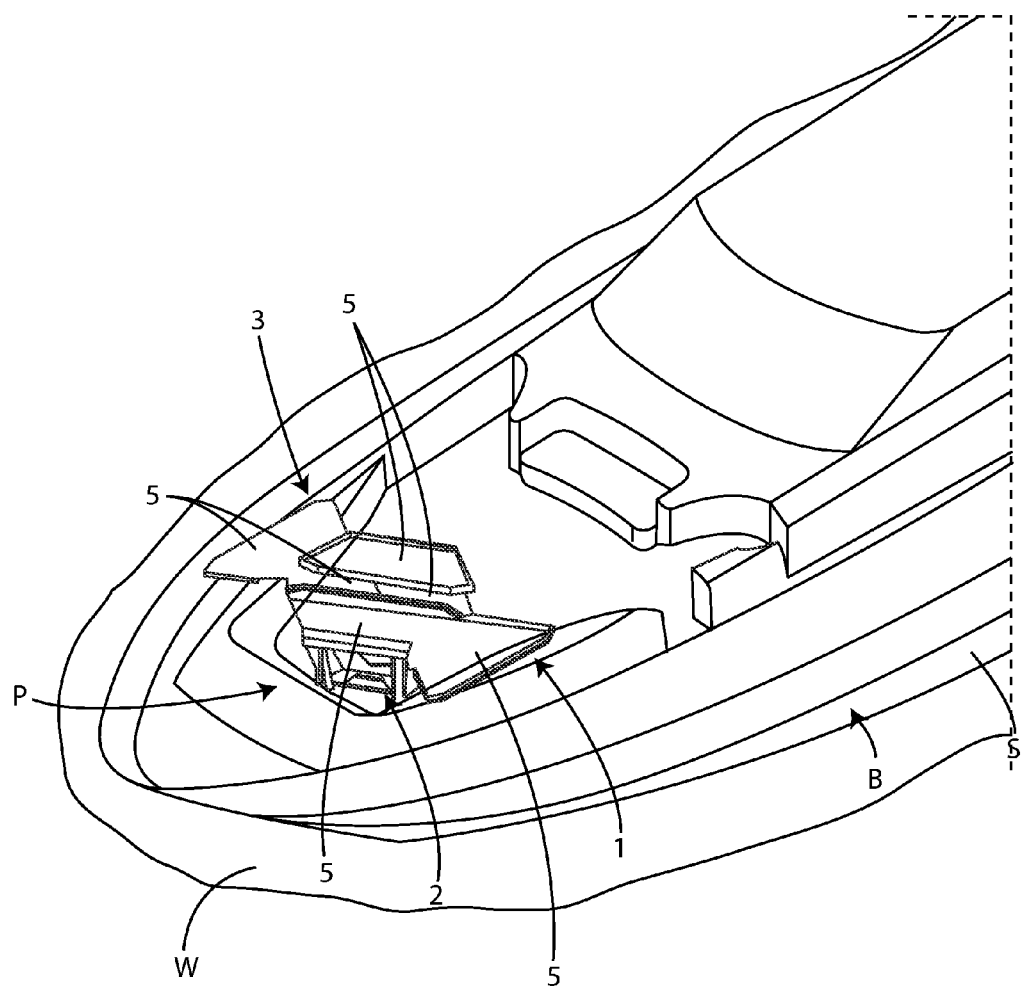

In particular, as illustrated in FIG. 3 but with greater detail in FIGS. 10 and 11, the control means firstly drive synchronously the movement of a first pair of peripheral panels 5 opposite each other, up to place them, thanks to the rotation means 12, coplanar with the central body 4 (the position shown in FIG. 13).

Figure 4:
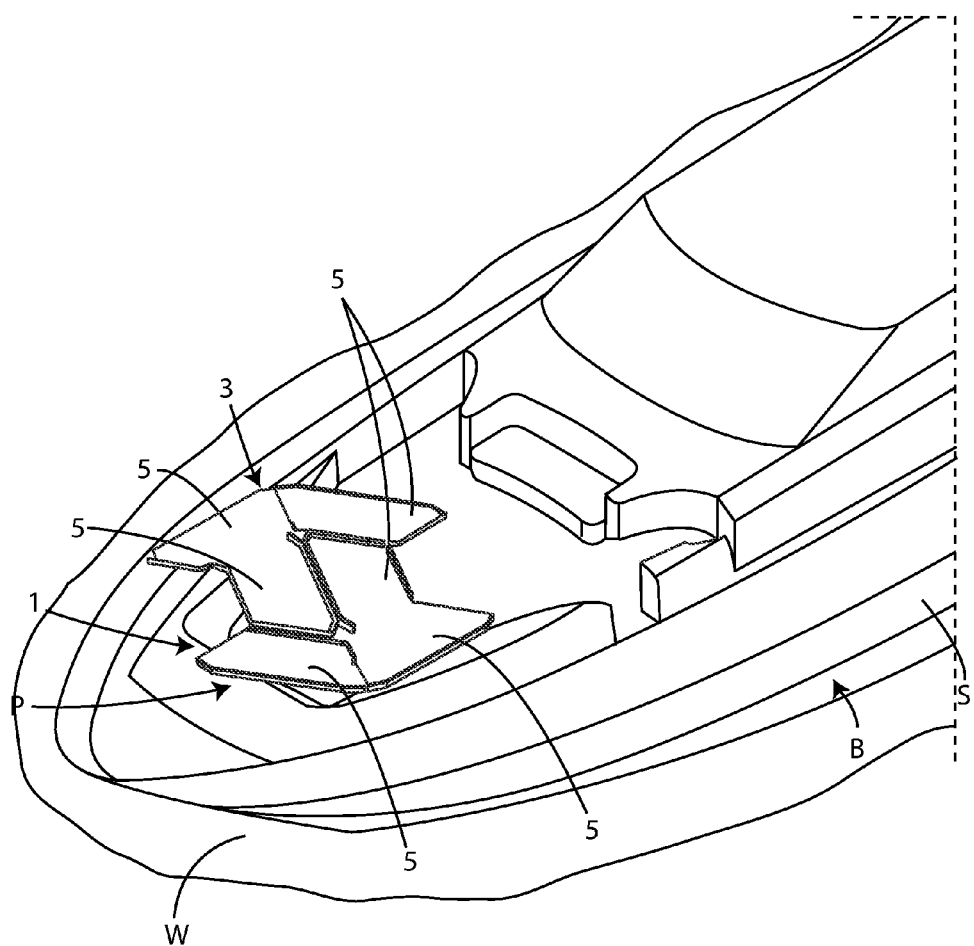
Figure 14:
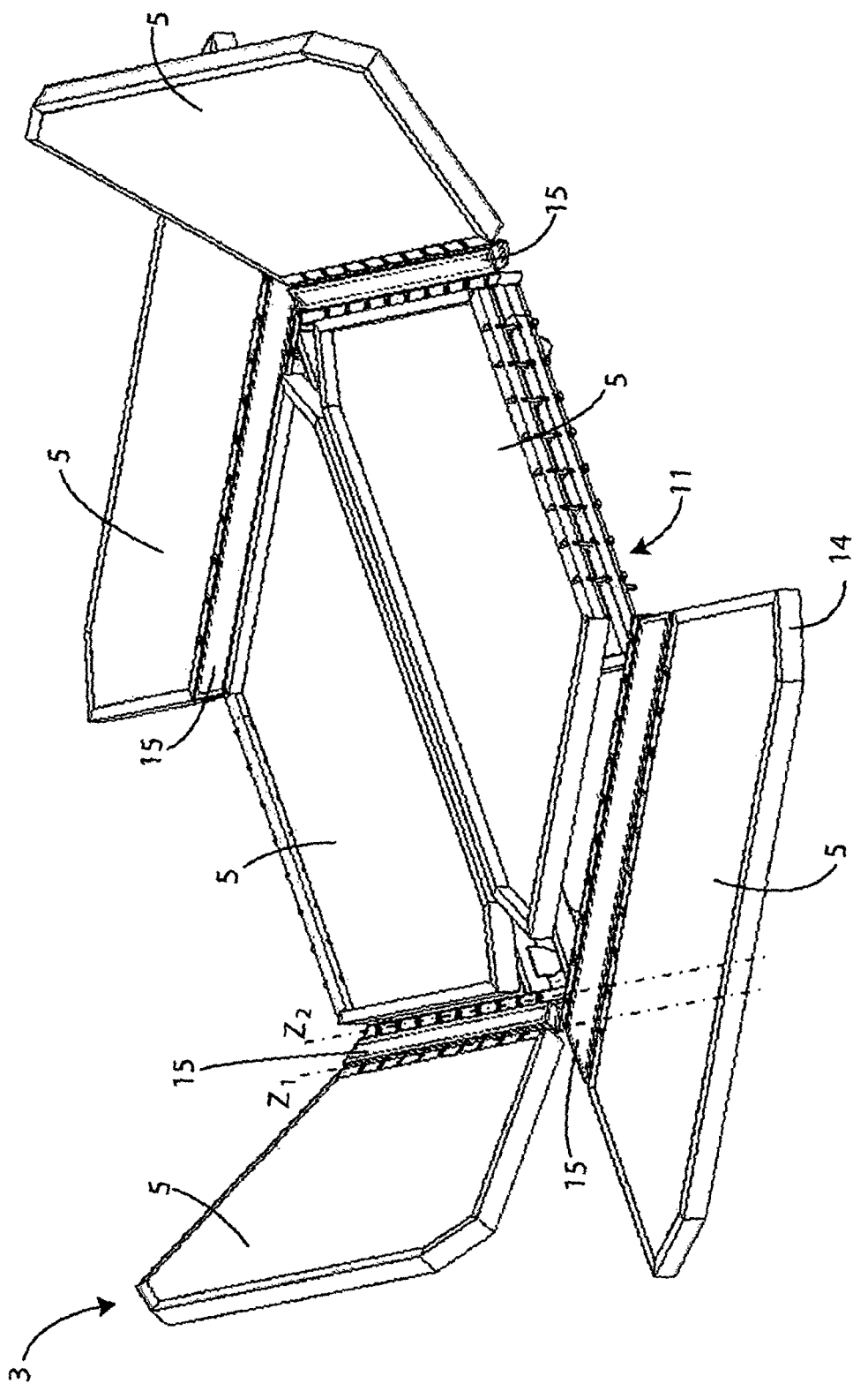
Figure 15:
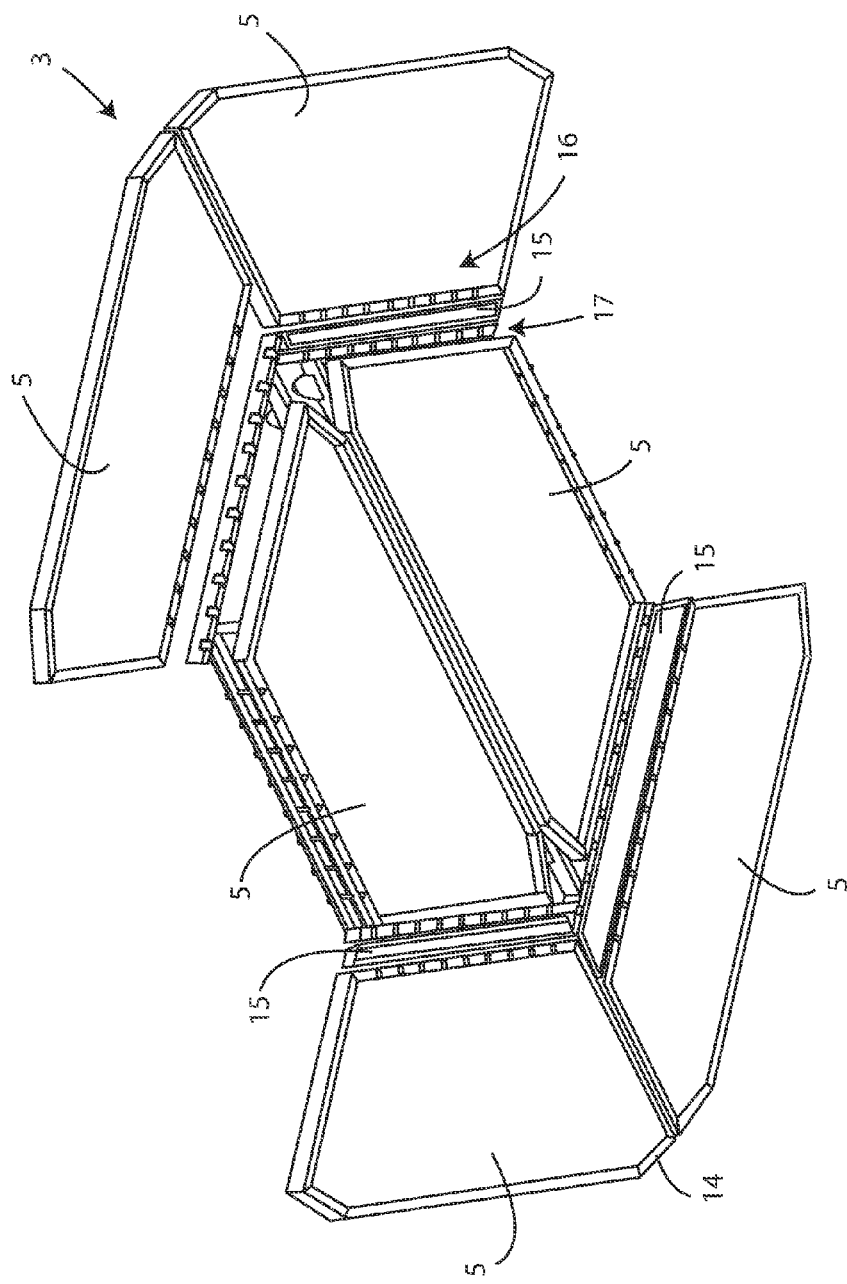

This being achieved and without interruption, the control means operate the articulated actuators 18 associated with a second pair of peripheral panels 5 opposite each other in order to cause their rotation and opening, according to what FIG. 14 illustrates, up to place them in the middle position shown in FIGS. 4 and 15, in which the peripheral panels 5 of the second pair moved are coplanar to the central body 4 and to the peripheral panels 5 of the first couple yet moved.

Finally, again without interruption with respect to the previous phases, the control means operate the articulated actuators 18 associated with the third pair of peripheral panels 5 opposite each other thereby causing, always thanks to the rotation means 12, their rotation and opening, as FIG. 16 illustrates.

Once the movement of the third pair of peripheral panels 5 has been completed, the whole assembly defines the operation position firstly introduced and forms the annular structure 7 surrounding the central body 4 with respect to which is coplanar, shown in FIGS. 5 and 9.

This allows to arrange the landing footboard 3 in the final operating position, useful to permit the effective landing of the aircraft in the best possible conditions of safety for the pilot.

In presence of critical or however not favourable weather conditions, such as for instance strong wind and stormy sea, the hull S of the boat B is exposed to the even violent action of the agitated wave motion that moves the landing footboard 3 from the horizontal ideal operating position, thereby complicating up to make almost impossible the landing manoeuvre by the pilot of the aircraft.

The platform 1 of the invention exerts its further advantage in these conditions, since the detection means, immediately and with infinitesimal precision, signal to the control means every single deviation of the landing footboard 3 from the horizontal position.

Through special computer program managed by the central processing and control unit of the control means, the moving means 44 and, in return, the compensation and levelling means 43 bring back with fine and continue adjustment the landing footboard 3 in the horizontal position, ideal for aircraft pilot's manoeuvre.

In particular, the first linear actuators 46 and the second linear actuators 47 cause the rotation of the landing footboard 3 around the longitudinal roll axis X in case the waves of the wave motion hit from the starboard side (right) or port side (left) the hull S of the boat B.

Driving of the first linear actuators 46 and the second linear actuators 47 is synchronized by the control means and, in any case, provides that, at each side of the central frame 27, the effects of the thrust pistons, coupled in reverse way to the same constructive components, reciprocally balance.

If the waves of the wave motion interfere with the hull S of the boat B thereby causing also or simply a pitching oscillation around the transverse axis Y, the control means drive the third linear actuators 53 which, thanks to the auxiliary fifth wheel/shaft couplings of the compensation and levelling means 43, contribute to restore or restore by themselves the horizontal position of the landing footboard 3.

The presence of the compensation and levelling means 43 ensures, therefore, that the landing footboard 3 constantly keeps the horizontal position, ideal in order that the aircraft pilot can perform with a certain ease and the maximum safety the landing manoeuvre on the boat B.

Obviously, if the use of the platform 1 is no longer necessary, the control means operated by the user move in a way contrary to that one just described firstly the three pairs of peripheral panels 5, starting from the third one, continuing with the second one and ending with the first one, so as to stack them again two by two one on the other and on the central body 4 of the landing footboard 3.

Subsequently, the control means act on the translation means 33 bringing them again into the perimetric seats 29 of the perimetrical frame 28 and thus arranging the landing footboard 3 in the non-use position, fully retracted with respect to the hull S of the boat B.

On the basis of the foregoing, it is, therefore, understood that the reduced dimensions platform for the landing of an aircraft on an access facility of the invention reaches the purposes and achieves the advantages yet mentioned.

In execution, changes could be made to the platform of the invention consisting, for example, in a support base which differs from that one described and illustrated in the accompanying drawings.

In addition, further embodiments of the reduced dimensions platform claimed herein could provide drive means different from those ones previously described, which does not affect the advantages brought by the present invention.

The platform for the landing of an aircraft of the invention allows to fully exploit a generally little used area of a boat, such as the prow.

In any case, the reduced dimensions platform of the invention could be mounted in free areas of a boat different from the prow and which, by surface extension, are fit for the purpose, for example on the central deck or at stern.

It is also stated precisely that the reduced dimensions platform for the landing of an aircraft object of the invention could be mounted on an access facility which differs from that one on which the previous description has been based, by indicative way: for example, indeed, in other applications, the platform of the invention could be mounted on fixed or mobile off-shore stations for submarine oil extraction plants, docks of ports and so on.

It is, finally, clear that many other variations may be made to the platform in question, without departing from the principle of novelty intrinsic in the inventive idea expressed here, as it is clear that, in the practical implementation of the invention, materials, shapes and sizes of the illustrated details can be changed, as needed, and replaced with others technically equivalent.

Where the constructive features and techniques mentioned in the following claims are followed by reference numbers or signs, those reference signs have been introduced with the sole objective of increasing the intelligibility of the claims themselves and therefore they have no limiting effect on the interpretation of each element identified, by way of example only, by these reference signs.

The invention claimed is:

1. A reduced dimensions platform for the landing of an aircraft on an access facility comprising:
   a support base, suitable to be fixed on a reference surface belonging to said access facility;
   a landing footboard, connected with said support base and suitable to receive said aircraft,
   wherein said landing footboard includes a central body, coupled with said support base, and a plurality of peripheral panels, operatively connected with drive means suitable to move said peripheral panels from or to a rest position, in which said peripheral panels are contained within the dimensions of said central body, to or from an operating position, in which said peripheral panels laterally project from said central body and are combined and side-by-side each other so as to be coplanar with each other and said central body and make said landing footboard ready to receive said aircraft;
   said support base including:
   a basic framework suitable to insist on said reference surface of said access facility;
   a net frame, superiorly coupled with said basic framework and composed of an inner part, which defines a substantially horizontal plane and supports said central body, and a perimetric wall orthogonally projecting from said inner part in order to laterally delimit said central body;
   wherein each of said peripheral panels is revolvingly coupled with said perimetric wall of said net frame through rotation means suitable to cooperate with said drive means in order to position said peripheral panels:
superiorly to said central body in said rest position, so that the free edge of a first peripheral panel is facing for a front section the free edge of a second peripheral panel directly opposite to and spaced apart from said first panel;
laterally to said perimetric wall of said net frame in said operating position, so that said free edge of said peripheral panels is facing outwardly and the outer surface of said peripheral panels is coplanar with the outer wall of said central body;
wherein in said operating position, the peripheral panels create an annular structure which surrounds said central body in order to place the landing footboard, in a final operating condition, suitable for the landing of the aircraft.

2. The platform as defined in claim 1 wherein said peripheral panels are opposite each other and arranged symmetrically with respect to a central axis which splits said central body.

3. The platform as defined in claim 1 wherein said peripheral panels are coupled with said central body said peripheral panels have a shape, size and profile that is equal to each other peripheral panel.

4. The platform as defined in claim 1 wherein each of said peripheral panels is provided with a limit ledge edge coupled through said rotation means with a linear strap of said perimetric wall.

5. The platform as defined in claim 1 wherein said landing footboard includes at least two pairs of peripheral panels, said peripheral panels being adapted to be moved in sequence by said drive means from or to said rest position, in which said peripheral panels are in pairs arranged on the same plane, parallel to the plane defined by said central body, to or from said operating position in which said peripheral panels are mutually side-by-side and coplanar in order to form said annular structure.

6. The platform as defined in claim 1 wherein said rotation means include:
an intermediate bar provided with two flat side faces opposite each other, a first side edge cooperating with one of said peripheral panels and a second side edge, opposite to said first side edge and cooperating with said perimetric wall of said net frame so as to perfectly conjugate to the outer edge of said perimetric wall in said final operating position;
a plurality of first pivot hinges, arranged at said first side edge of said intermediate bar and a bounded edge of said peripheral panels in order to bind said intermediate bar to said peripheral panels;
a plurality of second pivot hinges, arranged at said second side edge of said intermediate bar and said outer edge of said perimetric wall of said net frame in order to bind said intermediate bar to said perimetric wall.

7. The platform as defined in claim 1 wherein said drive means include a plurality of articulated actuators at least one of which is coupled with said net frame and one of said peripheral panels, said plurality of articulated actuators being placed below said net frame and when said plurality of articulated actuators are in said operating position, said plurality of articulated actuators are placed below said peripheral panel.

8. The platform as defined in claim 7 wherein each of said articulated actuators includes:
a linear actuator equipped with a protection cylinder, arranged below said inner part of said net frame, and a piston, sliding inside said protection cylinder and provided with one end fixed to a pair of shaped brackets protruding from said inner part of said net frame;
flexible elastic means, coupled with said piston through a joint element and with the lower wall of said peripheral panels through a pair of articulation levers facing, spaced apart and opposite each other.

9. The platform as defined in claim 8 wherein said joint element includes a first part and a second part, movable reciprocally one relative to the other on a plane, so as to give to said flexible elastic means an angled position with respect to the longitudinal axis of said piston.

10. The platform as defined in claim 9 wherein said flexible elastic means includes a helical spring, provided with a first end, coupled with a support bush integral with said second part of said joint element, and a second end associated with a support counter-bush integral with said articulation levers coupled with said peripheral panels to be moved.

11. The platform as claim 8 wherein said landing footboard includes a pair of guide plates facing and spaced apart each other, fixed to the lower flat face of said intermediate bar in order to maintain stable the conformation of said flexible elastic means when said drive means move said peripheral panels from or to said rest position to or from said operating position.

12. The platform as defined in claim 1 wherein said basic framework includes:
a reference plate adapted to be fixed to said to said reference surface of said access facility;
a central frame, superiorly coupled with said reference plate and defining a lower plane parallel to and spaced apart from said reference plate;
a perimetrical frame surrounding said central frame, with which is coupled so as to be coplanar to said central frame, and provided with a cantilevered peripheral portion.

13. The platform as defined in claim 1 wherein said platform includes translation means, interposed between said basic framework and said net frame in order to reciprocally connect said basic framework and said net frame, with said landing footboard in order to move said landing footboard to or from a non-use position, in which said landing footboard re-enters at least partially said access facility along a vertical axis orthogonal to the support plane of said access facility, while remaining arranged under the open sky and accessible to a user, to or from a middle position which precedes said operating position taken by said peripheral panels and in which said landing footboard protrudes from said access facility along said vertical axis.

14. The platform as defined in claim 13 wherein said translation means include:
a plurality of articulated arms, each coupled, on one hand, with said perimetrical frame through first constraint means arranged at perimetrical seats made in said perimetrical frame, and, on the other hand, through second constraint means with said net frame which supports said landing platform;
a plurality of linear actuators, cooperating with said articulated arms in order to move said landing platform between said non use position and said middle position and vice versa.

15. The platform as claim 12 wherein said platform comprises compensation and levelling means, operatively connected with moving means so as to constantly keep said landing footboard on a substantially horizontal plane when atmospheric agents, fluid masses and/or adjacent structures interfere with said access facility.

16. The platform as defined in claim 15 wherein said compensation and levelling means include a pair of main mechanical couplings of a fifth wheel and shaft, each of which consisting of a first rotation fifth wheel, fixed to said reference plate through anchoring means, and a first counter-fifth wheel, directly facing said first rotation fifth wheel, revolvingly coupled on one side with said central frame and on the other side with said first rotation fifth wheel through a first articulation pin adapted to allow the oscillation of said landing platform around a longitudinal axis passing through the centre of said central frame.

17. The platform as defined in claim 15 wherein said compensation and levelling means comprise a pair of auxiliary mechanical couplings of a fifth wheel and shaft, each of which comprises a second rotating fifth wheel, fixed to said perimetrical frame, and a second counter-fifth wheel, directly facing and opposite to said second rotating fifth wheel, revolvingly coupled on one side with said central frame and on the other with said second counter-fifth wheel through a second articulation pin adapted to allow the oscillation of said landing footboard around a transverse axis passing through the centre of said central frame orthogonally to said longitudinal axis.

18. The platform as defined in claim 17 wherein said main mechanical coupling of the fifth wheel and shaft are mutually opposed and separated by said central frame and said auxiliary couplings of said fifth wheel and shaft are mutually opposed and separated by said central frame.

19. The platform as defined in claim 16 wherein said moving means include:
   a pair of first linear actuators, symmetrically arranged each other with respect to the centre of said central frame, interposed between said central frame and said perimetrical frame;
   a pair of second linear actuators, symmetrically arranged each other with respect to the centre of said central frame, placed between said central frame and said perimetrical frame, each of said second linear actuators-being facing to and cooperating with said first linear actuators so as to rotate said landing footboard around said longitudinal axis through said compensation and levelling means;
   two third linear actuators facing and cooperating each other, symmetrically arranged with respect to said longitudinal axis and coupled on one side with said central frame and on the other side with said reference plate according to said transverse axis in order to rotate said landing footboard around said transverse axis through said compensation and levelling means.

20. The platform as defined in claim 12 wherein said platform comprises detection means, cooperating with said perimetrical frame in order to determine a deviation of said landing footboard from the horizontal position when atmospheric agents, fluid masses and/or adjacent structures interfere with said access facility.

\* \* \* \* \*